(12) United States Patent  (10) Patent No.: US 8,302,097 B2
Buco et al.  (45) Date of Patent: *Oct. 30, 2012

(54) SCHEDULING RESOURCES IN A PENALTY-BASED ENVIRONMENT

(75) Inventors: Melissa Jane Buco, Amawalk, NY (US); Rong Nickle Chang, Pleasantville, NY (US); Laura Zaihua Luan, Putnam Valley, NY (US); Christopher Ward, Glen Ridge, NJ (US); Joel Leonard Wolf, Katonah, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

This patent is subject to a terminal disclaimer.

(21) Appl. No.: 11/767,891

(22) Filed: Jun. 25, 2007

(65) Prior Publication Data

US 2008/0005744 A1    Jan. 3, 2008

Related U.S. Application Data

(63) Continuation of application No. 10/658,726, filed on Sep. 9, 2003, now Pat. No. 7,480,913.

(51) Int. Cl.
    *G06F 9/46* (2006.01)
(52) U.S. Cl. .................................................. 718/102
(58) Field of Classification Search .................. 718/102
    See application file for complete search history.

(56) References Cited

U.S. PATENT DOCUMENTS

2004/0111509 A1   6/2004  Eilam et al.
2005/0065826 A1   3/2005  Baker et al.

OTHER PUBLICATIONS

To Schedule or to Execute: Decision Support and Performance Implications Atif et al., 1999.*

* cited by examiner

*Primary Examiner* — Mengyao Zhe
(74) *Attorney, Agent, or Firm* — Yee & Associates, P.C.; William Stock

(57) ABSTRACT

The present invention relates to the problem of scheduling work for employees and/or other resources in a help desk or similar environment. The employees have different levels of training and availabilities. The jobs, which occur as a result of dynamically occurring events, consist of multiple tasks ordered by chain precedence. Each job and/or task carries with it a penalty which is a step function of the time taken to complete it, the deadlines and penalties having been negotiated as part of one or more service level agreement contracts. The goal is to minimize the total amount of penalties paid. The invention consists of a pair of heuristic schemes for this difficult scheduling problem, one greedy and one randomized. The greedy scheme is used to provide a quick initial solution, while the greedy and randomized schemes are combined in order to think more deeply about particular problem instances. The invention also includes a scheme for determining how much time to allocate to thinking about each of several potential problem instance variants.

22 Claims, 12 Drawing Sheets

BETS = {JOBS} x {TIME SLOTS}

FRACTIONAL ALLOCATION OF TIME SLOTS

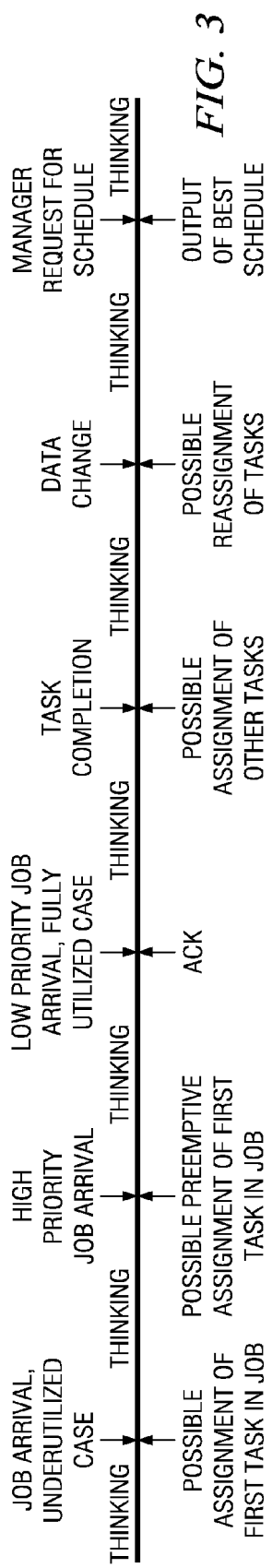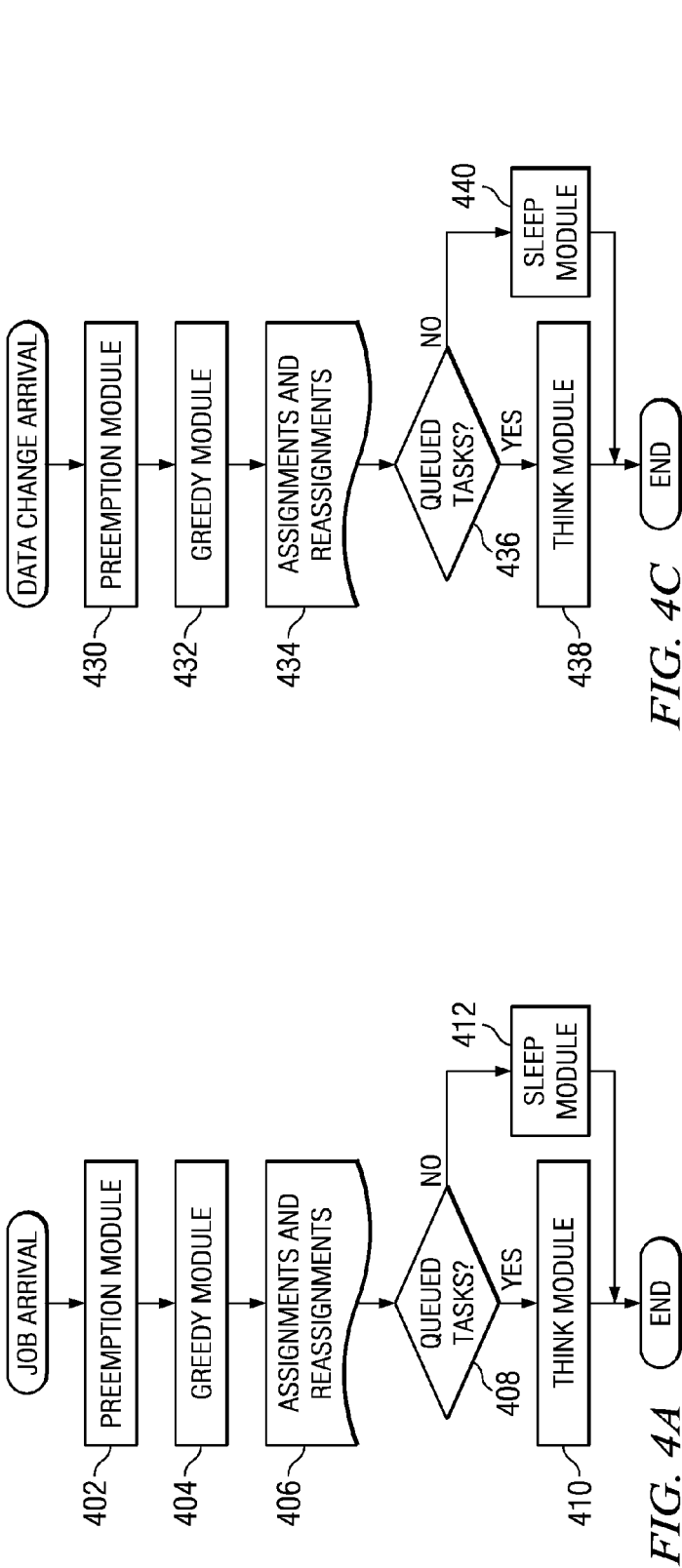

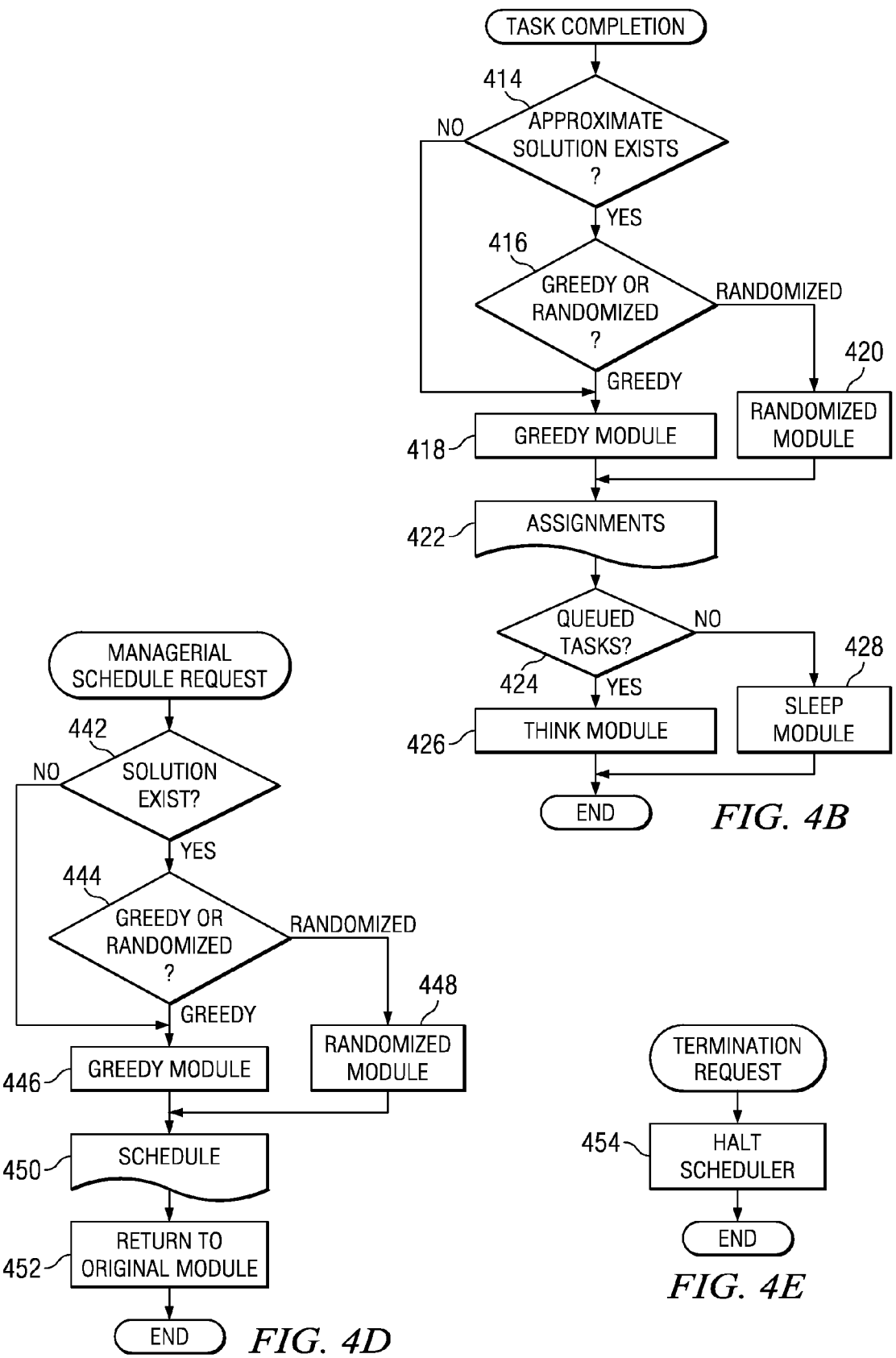

SCHEDULING RESOURCES IN A PENALTY-BASED ENVIRONMENT

This application is a continuation of application Ser. No. 10/658,726, filed Sep. 9, 2003, issued as U.S. Pat. No. 7,480,913.

BACKGROUND OF THE INVENTION

1. Technical Field

The present invention relates generally to scheduling, and more particularly, to techniques for providing schedules which minimize incurred penalties in the presence of service level agreements (SLAs).

2. Description of Related Art

Consider a help desk or similar environment in which employees and/or other resources respond to dynamically arriving events. A typical environment might consist of a team of employees of a service provider who support an electronic business (e-business) on demand server farm for a variety of customers. The events might be trouble oriented, for example when a server goes down. Alternatively, the events might be demand oriented, for example when a customer requests some new amount of data storage. Each of the events may cause the initiation of a job consisting of multiple tasks.

Assume, as is now becoming popular, that the customers have signed contracts called service level agreements (SLAs) with the service provider. These contracts are designed to enforce a grade of service by stipulating penalties for the provider based on the length of time required to perform the various tasks associated with the events, or perhaps based on the length of time required to perform the entire job. Penalties of this form are commonly structured as non-decreasing step functions of time. These functions are generalizations of the sort of deadline penalties typically studied in scheduling theory. For information on scheduling theory, see J. Blazewicz, K. Ecker, G. Schmidt, and J. Weglarz, *Scheduling in Computer and Manufacturing Systems*, Springer-Verlag, 1993; E. Coffman, editor, *Computer and Job-Shop Scheduling Theory*, John Wiley and Sons, 1976; and, M. Pinedo, *Scheduling: Thgeory, Algorithms and Systems*, Prentice Hall, 1995.

The scheduling problem of assigning tasks to employees and other resources while minimizing the total penalties paid belongs to a class of mathematical problems for which exact solutions are essentially intractable to attain. But the potential savings in penalties possible with a good quality scheduling tool can be quite dramatic as compared with an ad hoc solution. Moreover, the customers will be significantly more satisfied if such a scheduling tool is implemented, because the assignments of tasks in jobs to employees and other resources will be more fair. This will result in greater customer loyalty, an intangible but very real benefit.

Therefore, it would be advantageous to provide an SLA penalty oriented optimizing scheduler which assigns tasks in jobs to personnel and other resources in a help desk or similar environment.

SUMMARY OF THE INVENTION

The present invention relates to the problem of scheduling work for employees and/or other resources in a help desk or similar environment. The employees have different levels of training and availabilities. The jobs, which occur as a result of dynamically occurring events, consist of multiple tasks ordered by chain precedence. Each job and/or task carries with it a penalty which is a step function of the time taken to complete it, the deadlines and penalties having been negotiated as part of one or more service level agreement contracts. The goal is to minimize the total amount of penalties paid. The invention consists of a pair of heuristic schemes for this difficult scheduling problem, one greedy and one randomized. The greedy scheme is used to provide a quick initial solution, while the greedy and randomized schemes are combined in order to think more deeply about particular problem instances. The invention also includes a scheme for determining how much time to allocate to thinking about each of several potential problem instance variants. Those skilled in the art will recognize that this invention applies more generally, for instance to more arbitrary resources, more general task graphs, more general penalty functions, and can be employed in nearly any workflow environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative(embodiment when read in conjunction with the accompanying drawings, wherein:

FIG. 3 illustrates an example scheduler timeline in accordance with a preferred embodiment of the present invention;

FIGS. 4A-4E illustrate the operations of scheduler control mechanisms, and various modules which the scheduler employs, in accordance with a preferred embodiment of the present invention;

DETAILED DESCRIPTION OF THE PREFERRED EMBODIMENT

Figure 1:
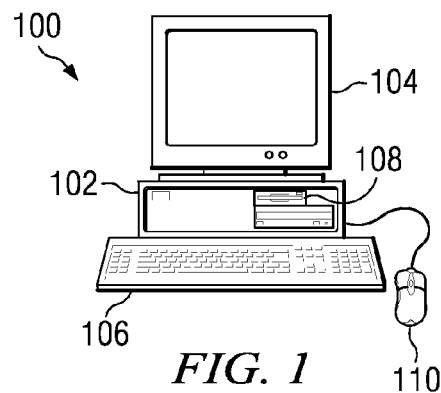
FIG. 1 is a pictorial representation of a data processing system in which the present invention may be implemented in accordance with a preferred embodiment of the present invention.

According to various exemplary embodiments of the present invention, a scheme is provided to schedule personnel and/or other resources in a help desk or similar environment. The goal is to minimize the penalties paid by the provider to the customers. These penalties typically arise from signed customer service level agreements known as SLAs, though those skilled in the art will realize that many other penalty environment scenarios may apply as well. For example, the penalties could be internal as well as external.

The tasks in each job are assumed to be performed according to chain precedence. In other words, there is a strict sequencing of the tasks within a job, and a given task can only be started when the previous task is complete. The scheduler tries to minimize the sum of the incurred SLA penalties, one summand for each job and/or task, based on their absolute or relative completion times. Personnel availability, including, for example, lunches, breaks, shift start and end times, are accommodated. Personnel skills and training on various tasks are also taken into account. Tasks causing built-in delays which are essential but do not directly involve the existing personnel can be modeled. Such delay tasks might pertain to work performed by software agents, work performed by personnel from other shops, and so on. The scheduler can allow for the common assignment of tasks to personnel, so that an employee (or employees) assigned to one task would also be assigned to all other tasks in a collection of tasks. One can also define tasks which cannot be handled simultaneously, perhaps due to common resource requirements. Multiple priority levels of jobs are modeled. If a higher priority job arrives, it will cause immediate preemption of a task associated with a lower priority job, as long as that preemption is useful.

Key elements of the scheduler design philosophy are as follows:

The scheduler should be event-driven, responding synchronously to each event arrival with a (possibly empty) list of new preemptive or non-preemptive assignments, followed by an acknowledgement that the list of assignments has been completed. Common examples of events are job arrivals, task completions, and data changes—the last is essentially a catchall category which includes revisions to personnel availability, task components, and so on. Other examples of events include requests from a manager or other authorized personnel for a schedule and termination requests.

The scheduler should never itself be a bottleneck. In other words, the scheduler should be able to provide a very quick decision, even to a problem instance that it has not anticipated. For example, a new job arrival generally cannot be anticipated with much accuracy, and the scheduler therefore does not try to deal with these. But the arriving job may be of high priority and thus the first task in that job might preempt an existing task assignment. This quick response philosophy argues for a scheduling scheme that is fast and produces a solution that is of at least reasonably good quality. More specifically, its immediate task assignments and reassignments should not be so poor that decent quality continuations of the schedule become impossible. The invention employs a so-called greedy scheduling heuristic for this purpose. The greedy scheme is likewise useful for data changes, which are presumably relatively rarer events. The greedy scheme is employed to initiate the thinking about task completion events as well.

On the other hand there should also be a highly interruptible scheduling scheme which can potentially improve upon the solution quality obtained by the greedy scheme given sufficient think time. Thus, the invention employs a so-called randomized scheduling heuristic as well. It is interruptible in the sense that each randomized schedule can be produced quickly, so that interruption will only potentially disrupt one of many iterations of the algorithm. The best solution value found is always kept, along with its random seed. If the best solution value at a particular point in time happens to be that of the initial greedy heuristic, this fact is denoted as a seed of zero. This allows the invention to re-compute the best overall solution found very quickly, be it based on the initial greedy scheme or by an iteration of the randomized scheme. In other words, the entire solution need not be stored, just the seed that generated it. With the seed the entire solution can be reconstructed.

The scheduler should never be idle in the presence of queued (or, equivalently, inactive) tasks, in other words, if any scheduling problem remains to be analyzed. It should devote its computational resources towards solving multiple alternative projected potential instance variants of the problem that it can anticipate with some degree of accuracy. Specifically, the invention forces the scheduler to bet both on which task will complete first and on approximately when the task will complete. Since the jobs typically consist of many tasks, the number of task completion events will generally dominate the number of job arrival events, typically by an order of magnitude or so. And the number of change events should generally be smaller yet. It is useful to imagine an analogy here to the scenario of a chess playing computer (for example, Deep Blue) playing a human challenger (for example, Garry Kasparov). The computer thinks continually, regardless of whose turn it is. When it is the human's turn the machine can think about which move the human might make, and when. The machine can then allocate an appropriate amount of time for each of these possible "bets," and thus have an answer ready whenever the human makes his move. (Deep Blue does not currently allocate its think time this way. It devotes its entire think time on the move it guesses its opponent is most likely to make.)

At the beginning of a "think time" period the scheduler, therefore, quickly solves a network flow resource allocation problem. See T. Ibaraki and N. Katoh, *Resource Allocation Problems: Algorithmic Approaches*, MIT Press, 1988. The goal is to find the optimal think time allocations. This covers all the possible task completion/ task time "bets," maximizing the weighted average of the expected improvement, and thus minimizing the weighted average of the expected penalties paid.

The scheduler "holds its cards close to the vest." That is, it only reveals the very next task assignment to the employee, such as upon completion of the previous task, or perhaps the next preemptive task reassignment, such as upon the arrival of a higher priority job. Such a "just in time" philosophy has the benefit of not over committing solutions in a dynamically changing environment. The employee does not see additional, non-immediate task assignments, and thus will not be confused if they are reassigned due to arrivals and data changes beyond the ability of the scheduler to guess correctly. Additionally, the employee has no ability to "pick and choose" amongst several tasks. The employee only sees one task at a time.

On the other hand, the scheduler always allows authorized personnel, such as managers, to be able to view and/or override all scheduling decisions.

The scheduler needs to have sufficient infrastructure to allow real-time maintenance and monitoring of the actual job, personnel, and penalty status. For example, there needs to be infrastructure to map events into one or multiple SLA penalties.

1. Architecture

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
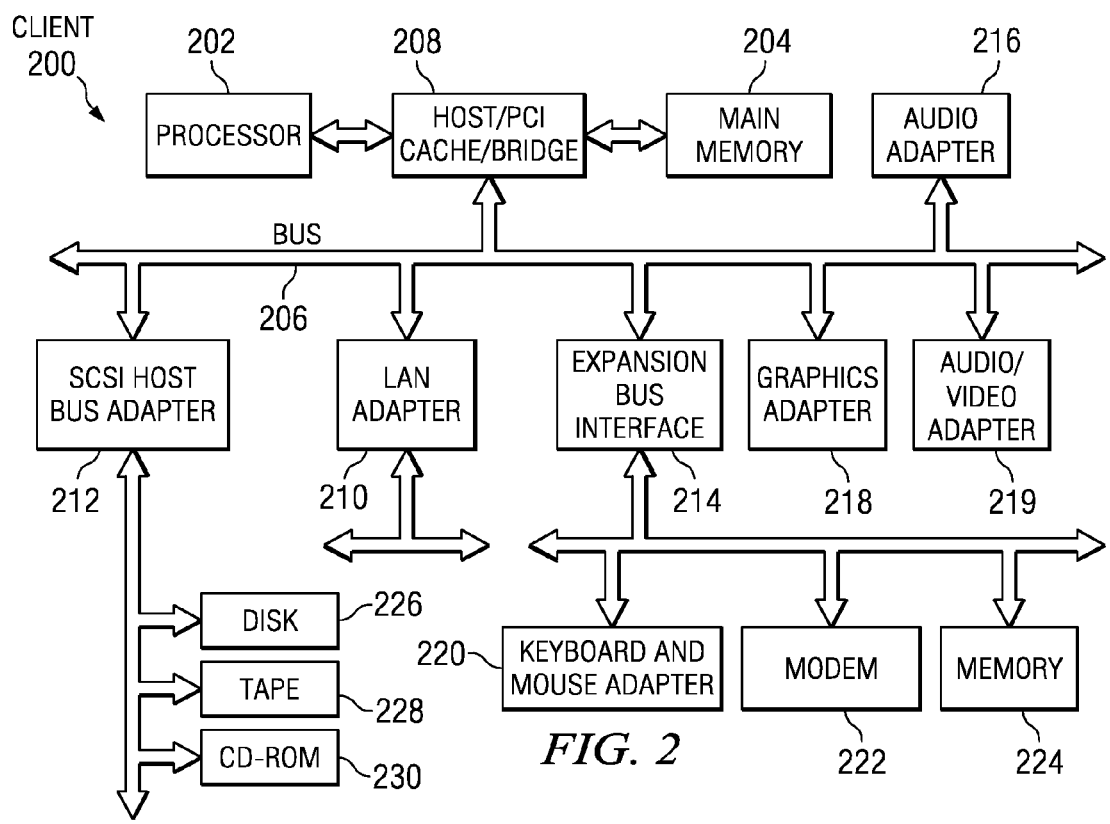
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

2. Overview

The invention can be visualized most readily in terms of the example scheduler timeline shown in FIG. 3. Here one sees the synchronous responses to stochastically arriving events such as job arrivals, task completions, data changes and manager requests. After composing and transmitting a (possibly empty) list of scheduling assignments or reassignments, or showing the manager a schedule, the invention goes back to thinking, perhaps about a newly revised problem. One additional event recognized by the scheduler is a request to terminate. If there is no work for the scheduler to do, which occurs when there are no queued tasks to think about scheduling, it simply sleeps, waiting to be awakened, for example, by a subsequent job arrival.

FIGS. 4A-4E illustrate the operations of scheduler control mechanisms, and various modules which the scheduler employs, in accordance with a preferred embodiment of the present invention. These include the greedy module, the randomized module, and the thinker module. They also include a sleep module for instances in which no scheduling work is present, a preemption module to handle instant reassignments of work to personnel when a higher priority task arrives (or becomes relatively higher due to a change in data), as well as an interrupt module which can stop execution of any other module at virtually any time. Once the scheduler is initiated there can be five types of interrupts, namely:

A job arrival.
A task completion.
A change in the data (which does not involve a job arrival or a task completion).
A manager request for a schedule.
A scheduler termination request.

The invention can be appreciated by considering the effects of each of these interrupt types. An interruption can occur and be acted upon while the scheduler is in any state.

With reference to FIG. 4A, a scheduling control mechanism for handling a job arrival is illustrated in accordance with a preferred embodiment of the present invention. The process begins upon a job arrival and the scheduler checks the priority level of the job compared to the levels of all active jobs. If there are instances where active jobs are of lower priority than the incoming job, then the preemption module is called (step 402) to perform minimal reassignments, creating a revised list of active and queued tasks which meet the preemptive priority rules. This module will be described below. The scheme then immediately enters the greedy module (step 404) to quickly find a high quality schedule for all previously existing active and queued tasks plus the tasks associated with the new job. The greedy module employs the expected (remaining) execution times of each of the tasks as input.

Once the immediate assignments and reassignments of the greedy and preemption modules are returned (step 406) and the appropriate bookkeeping performed, a determination is made as to whether queued tasks still remain (step 408). In the normal case that queued tasks still remain, the scheduler enters and reinitiates the think module (step 410) and the process ends. Think module is described below with reference to FIG. 12. However, if no queued tasks remain in step 408, the scheduler enters the sleep module (step 412) and the process ends. The sleep module will be described in further detail below.

With reference now to FIG. 4B, a scheduling control mechanism for handling a task completion is illustrated in accordance with a preferred embodiment of the present invention. The effect of a task completion depends on the state of the scheduler. In the atypical case that the scheduler is sleeping, it acknowledges the interruption, does the relevant bookkeeping and goes back to sleeping. In the more normal case of existing queued tasks, the scheduler examines the set of greedy or randomized solutions already computed during previous thinking for one which involves the actual task that completed and approximates the actual time of the task completion. In fact, many such solutions may have been computed, the scheduler having kept only the best one. More precisely, the full solution is never kept, but the seed associated with the solution is—this is the random seed used by the randomized scheme if that solution was best, and 0 if the solution obtained by the greedy scheme was best.

The process begins upon the arrival of a task completion and a determination is made as to whether an approximate solution exists (step 414). If such a solution exists, a determination is made as to whether a greedy module or randomized module is the appropriate module (step 416). If the greedy module is the appropriate module, the scheduler enters the greedy module (step 418). The greedy scheduler is described in further detail below with reference to FIGS. 7A and 7B. Otherwise, if the randomized module is the appropriate module in step 416, then the scheduler enters the randomized module (step 420). The randomized scheduler is described in further detail below with reference to FIGS. 8A and 8B. Also, if a solution does not exist in step, the process continues to step 418 to enter the greedy module to quickly find a high quality solution.

Using the greedy module or the randomized module, the scheduler recalculates the solution and returns the immediate assignments and reassignments (step 422). The greedy module employs the actual task completion time of that task which has just completed. Then, appropriate bookkeeping is performed and a determination is made as to whether queued tasks still remain (step 424). If queued tasks still remain, the scheduler reinitiates the think module (step 426) and the process ends. Otherwise, the scheduler enters the sleep module (step 428) and the process ends.

Turning now to FIG. 4C, a scheduling control mechanism for handling a data change arrival is illustrated in accordance with a preferred embodiment of the present invention. The effect of a data change is similar to that of a job arrival. The process begins upon a data change arrival and the scheduler checks the priority level of the changed job compared to the levels of all active jobs. If there are instances where active jobs are of lower priority than the changed job, then the preemption module is called (step 430) to perform minimal reassignments, creating a revised list of active and queued tasks which meet the preemptive priority rules. The preemption module considers all queued tasks of jobs whose priorities are now higher than those of active tasks, preempting minimally as required by the constraints.

The scheme then immediately enters the greedy module (step 432) to quickly find a high quality schedule for all previously existing active and queued tasks plus the tasks associated with the new job. The greedy module employs the (potentially revised) expected execution times of each of the tasks as input. The immediate assignments and reassignments of the greedy and preemption modules are returned (step 434) and appropriate bookkeeping performed. A determination is then made as to whether tasks still remain (step 436). In the normal case that queued tasks still remain, the scheduler enters and reinitiates the think module (step 438). However, if no queued tasks remain in step 436, the scheduler enters the sleep module (step 440) and the process ends.

FIG. 4D is a flowchart illustrating a scheduling control mechanism for handling a managerial request. The scheduler responds to a managerial scheduling request by "finding" the best approximate greedy or randomized schedule if it already exists, or by using the greedy module to generate one otherwise. This scenario is similar to that of a task completion. After returning the full schedule the invention simply returns to its previous state.

The process begins upon the arrival of a managerial request. A determination is made as to whether a solution exists (step 442). If a solution exists, a determination is made as to whether the greedy module or the randomized module is the appropriate module (step 444). If the greedy module is the appropriate module, the scheduler enters the greedy module (step 446). Otherwise, if the randomized module is the appropriate module in step 444, then the scheduler enters the randomized module (step 448). Also, a solution does not exist in step 442, the process continues to step 446 to enter the greedy module to quickly find a high quality solution. Using the greedy module or the randomized module, the scheduler recalculates the solution and returns the schedule (step 450). Then, the scheduler returns to the original module (step 452) and the process ends.

FIG. 4E is a flowchart illustrating a scheduling control mechanism for handling a termination request. The scheduler responds to a termination request by halting the scheduler immediately (step 454). Thereafter, the process ends.

The sleep module of the invention does nothing except wait for an interruption.

The preemption module examines the inactive job whose first queued task is not a delay task and whose priority is highest, comparing it with an active job whose first task assigned to an employee and whose priority is lowest, if such a pair exists. It checks to see if that employee can meaningfully work on the higher priority task. (This involves checking the commonality constraints, the non-simultaneity constraints and the task time estimates.) If the reassignment is impossible, the preemption module examines the next lowest priority active job, and so on. Eventually one of two things will happen:

A pair will qualify for reassignment. In this case, the scheme will swap the roles of the active and queued tasks, perform the relevant bookkeeping and repeat the entire process.

No pair will qualify for reassignment. In this case the scheme terminates.

The thinker module is the component of the scheduler which attempts to anticipate the next interruption. If the interruption is a task completion, the likelihood is that the time spent thinking will yield a better quality schedule than would be otherwise quickly available. If the interruption is a job arrival or a data change, this think time will definitely be wasted. An interruption for a managerial schedule request has no effect on the utility of this thinking, except to use up a little think time. And, of course, a termination interruption makes the issue entirely irrelevant. Given the fact that the jobs are likely to be composed of many tasks, and the fact that data changes will probably be infrequent, one can argue that the task completion interrupts will predominate. This observation is the reason that the thinker module is effective.

The first goal of the thinker is to approximate the theoretically infinite number of possible first task completion possibilities by a finite number of alternatives. Any active task may complete first, of course, and given the chain precedence constraints these correspond precisely and naturally with the active jobs. There are only a finite number of active tasks, but there are an infinite number of possible times in the future at which each active task may complete. So the invention uses discrete time approximations, employing a time slot length $\pi$. One minute might typically be chosen as the length of this slot. Given the current time t, the thinker considers approximate task completion times of $t+\tau$, $t+2\tau$, and so on, up to, but not including, a time horizon of $t+H\tau$. H is unitless, typically chosen so that $H\tau$ comprises the length of a long shift, perhaps eight hours or so.

A bet on which active task/job will complete first and when will consist of a choice of one particular active task and a task completion time $t+h\tau$, where $0<h<H$. The completion times of all other active tasks will therefore be assumed to be greater than this completion time $t+h\tau$: The mechanism of the present invention chooses the expected completion time conditioned on the fact that this completion time is greater than $t+h\tau$, rounded to the nearest time slot amongst the set $\{t+(h+1)\tau, \ldots, t+H\tau\}$. For all queued tasks the execution time is assumed to be the expected execution time. Thus a bet yields a scheduling instance. The greedy module can use this as input, yielding a schedule of generally good quality. Similarly, the randomized module can use this plus a random seed as input, again yielding a schedule (generally of relatively lesser quality). In fact, the invention will always evaluate a particular bet by first executing the greedy module for the scheduling instance, and then iteratively executing the randomized module with randomly generated seeds, keeping the seed of the best solution found to date.

Figure 5:
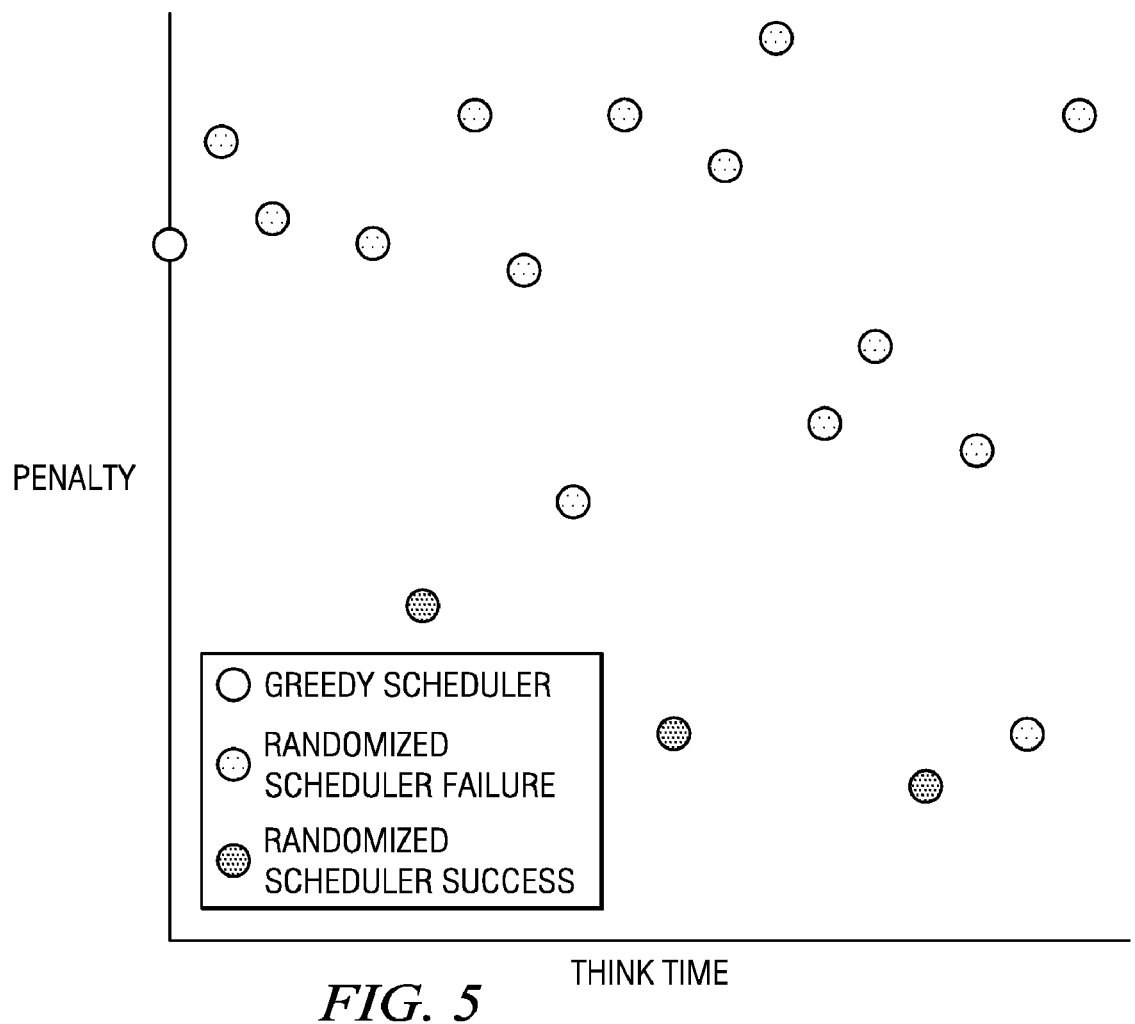
FIG. 5 is a graph illustrating how the think time approach improves the quality of a schedule in accordance with a preferred embodiment of the present invention.

FIG. 5 is a graph illustrating how the think time approach improves the quality of a schedule in accordance with a preferred embodiment of the present invention. The quality of the schedule improves for a particular bet as a function of the number of iterations and, thus, effectively as a function of think time. The penalty associated with the greedy schedule is shown using a white circle. Successes of the randomized schedule are shown using black circles, while failures are shown using shaded circles. In this figure, four separate schedules take turns being "best." One arises as greedy and the other three as randomized iterates.

The key question for the thinker module is this: How does one assign the amount of think time allocated to each of the bets in an intelligent fashion? Each bet can be regarded as a pair consisting of a task/job combination and a completion time $t+h\tau$ corresponding to the $h^{th}$ time slot. Clearly the thinking associated with this bet must be accomplished by the end of the $h^{th}$ time slot; otherwise, the results would be too late to be useful. The invention assumes the existence of a fixed window W defining the maximum number of time slots for which a given problem can be thought about. Specifically, the thinker module will consider a task/job combination completing at time $t+h\tau$ during the time slots ending at times $t+\max(1,(h-W+1))\tau$ through $t+h\tau$. For ease of notation, let $h^*=\max(1,(h-W+1))$.

Figure 6:
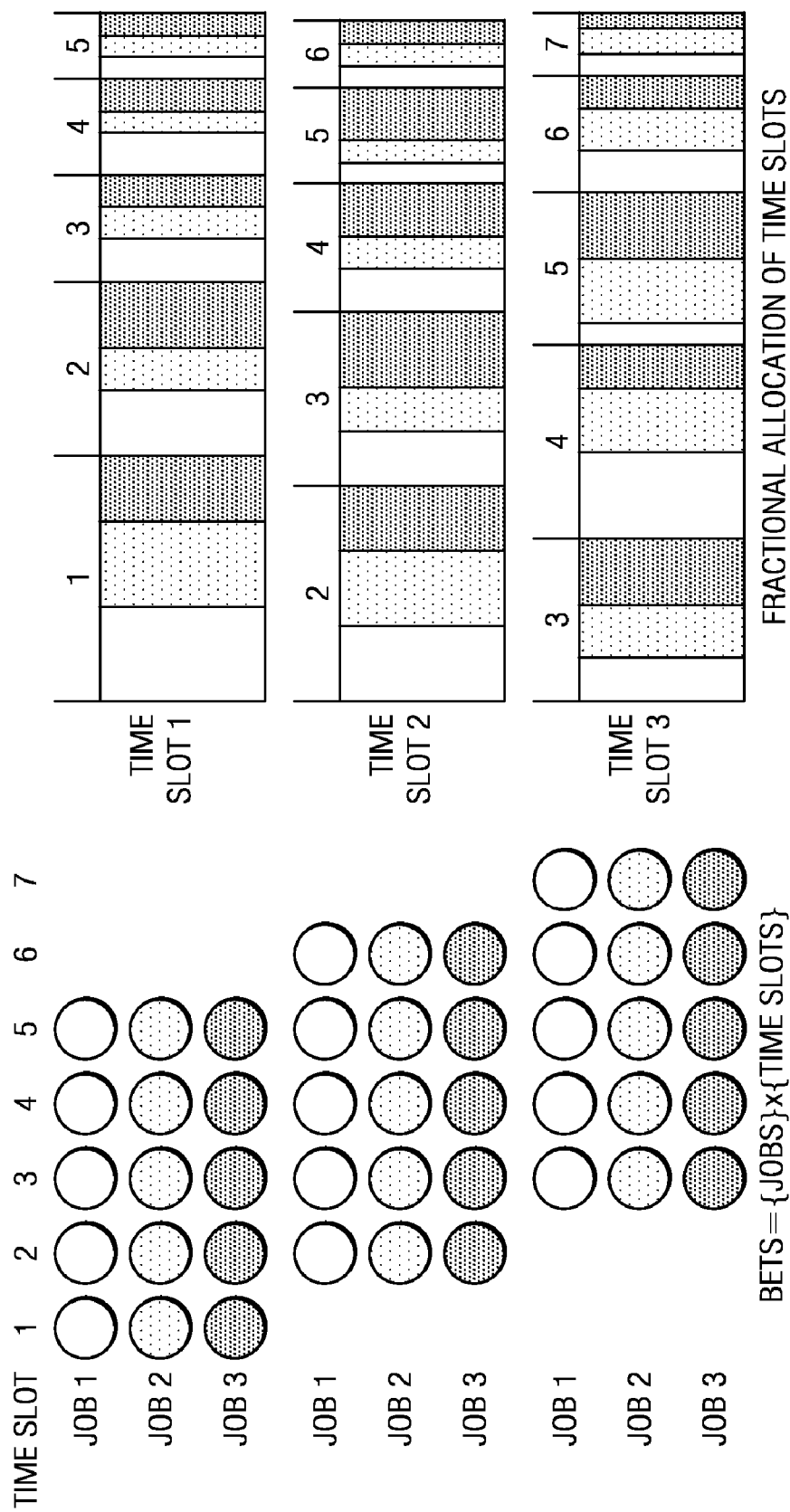
FIG. 6 is a diagram illustrating the allocation of think time in accordance with a preferred embodiment of the present invention.

FIG. 6 is a diagram illustrating the allocation of think time in accordance with a preferred embodiment of the present invention. In the depicted example, there are three job/tasks and a window size W=5, which may be a typical window size. In time slot 1, the thinker module considers the problems associated with each of the three job/tasks completing at the end of five distinct time slots ending at times $t+\tau$ through $t+5\tau$. In time slot 2 the thinker module considers the problems associated with each of the three job/tasks completing at the end of five distinct time slots ending at times $t+2\tau$ through $t+6\tau$, and so on. The left side of the diagram depicts the fifteen problem instances considered during each time slot, while the right side of the diagram illustrates possible think time allocations for each such time slot. These computations depend on the distributions of the completion times for each job/task combination as well as estimates of the amount of improvement possible as a function of think time. The actual technique for computing this from the given data will be explained later.

The remaining mathematical details of the invention involve the greedy scheduling scheme, the randomized scheduling scheme, and the think time allocation scheme. These can be best understood by fixing the following additional notation. Note that the scheduler of the invention allows both employees and jobs to be "parked," which simply removes these entities from consideration by the scheduler temporarily, until they are "unparked."

First, there are variables that describes the number of jobs and employees:
  I: the number of employees, indexed by i—this should include all employees who will be working at any time during the scheduling horizon, whether active, queued or parked.
  J: the number of jobs, indexed by j—this should include all current and not completed jobs, including those that are currently active, queued, or parked.

Associated with each job there are variables which describe the job itself, including the tasks involved.
  $K_j$: the number of current (uncompleted) tasks in job j, indexed by k. If job j is active, it can be assumed that task 1 is active, since the invention will always prune off completed tasks and re-index the remaining tasks.
  $D_{j,k}$: the number of deadlines for task k of j, indexed by l.
  $P_{j,k,l}$: the penalty at the lth deadline step for task k of job j.
  $T_{j,k,l}$: the absolute time of the lth deadline for task k of job j.
  $X_{j,k}$: 1 if task k of job j is a delay task, 0 otherwise.

$S_{j,k,i}$: the estimated time remaining to complete non-delay task k of job j for employee i. This value may be chosen based on a more general probability distribution and/or on other considerations, as will be discussed subsequently. For active tasks these time estimates are constantly being updated. For tasks that have not yet been started the times correspond to the estimated execution times of the full task.

$S_{j,k,0}$: the time remaining to complete delay task k of job j. The same comments apply.

$C_{j,k}$: the index of the list if task k of job j is a member of a commonality list, 0 otherwise.

$N_{j,k}$: the index of the list if task k of job j is a member of a non-simultaneity list, 0 otherwise.

$Q_j$: the preemptive priority level of job j, with 1 being the highest (non-preemptable) level. Higher indexes correspond to lower priorities.

M: the maximum priority level.

$Y_j$: i if job j is active and assigned to employee i and not a delay task, 0 if job j is active but a delay task, −1 if queued, −2 if parked—again, if a job is active the first task must be active.

There are also variables which describe the employees. In all cases this includes active, inactive and parked employees:

$A_i$: the number of availability changes for employee i, indexed by m.

$B_{i,m}$: the availability of employee i during range m. This includes the case m=0. This value must be a real number between 0 and 1. A value of ¼, for example, would indicate that the employee is working on something else unrelated and unknown to the scheduler ¾ of the time. A lunch break would be indicated by setting the availability to 0 during the appropriate time interval.

$R_{i,m}$: the absolute time of the $m^{th}$ availability change for employee i.

There is one variable which describes the employee who must handle a task on a commonality list:

$E_n$: the employee who must handle tasks on common list with index n, if that employee has already been determined due to a prior scheduling decision, and 0 otherwise.

In a preferred embodiment, all information passed to the scheduler is checked for internal consistency, and all scheduling information passed back from the scheduler will be in terms of the unique job, task and employee ids.

3. The Greedy Scheduling Scheme

The greedy scheduling scheme attempts to complete a schedule containing the active tasks by "inserting" high quality assignments for the queued tasks which happen to meet the constraints. The scheme is greedy in the sense that it always implements locally optimal decisions.

In fact, the scheme will greedily insert the next queued and not yet inserted task in some job into the schedule, the choice maximizing over all relevant jobs a rather elaborate prorated increased penalty metric. Then the greedy scheme will remove that task from consideration and repeat the process iteratively. This will continue until all tasks have been inserted. The metric used in the greedy scheme measures the urgency with which the particular task in question and the remaining tasks of that job need to be inserted quickly in order to avoid paying significantly increased penalties. Suppose, before the scheme begins, that the first queued task for job j is $q_j$. This task could theoretically begin at the current time $t_{j,0}=t$, provided the job does not have a currently active task. Otherwise the scheme estimates the time $t_{j,0}>t$ at which this task could begin based on the chain precedence constraint. Next, consider the more general case. Suppose that for job j the next uninserted task at some iteration of the greedy scheduling scheme is $k_j$. Let $t_{j,k}$ denote the earliest possible completion time, estimated by the scheme, of completing task $k \geq k_j$. For this task the scheme considers the last deadline $l_{j,k} \leq t_{j,k}$ and the possibly empty set of remaining deadlines $\{l/l_{j,k} < l \leq D_{j,k}\}$, for which $T_{j,k,l} > t_{j,k}$. The overall cost function for task k is given by $$\max\{l \mid l_{j,k} < l \leq D_{j,k}\}\left(\frac{t_{j,k} - t_{j,0}}{T_{j,k,l} - t_{j,0}}(P_{j,k,l} - P_{j,k,l_{j,k}})\right)$$

This formula measures the maximum incremental penalty which would be paid for task k across all meetable deadlines l, prorated by the ratio of the minimum amount of time needed to schedule task k divided by the amount of time to the deadline—a measure of the slack available. The units are in money, since the fraction is expressionless. In effect, this term maximizes the urgency to schedule the task quickly.

The overall metric includes one summand for each possible task k. Explicitly, the metric is as follows:

$$\sum_{k=k_j}^{K_k} \left[\max_{\{l|l_{j,k} < l \leq D_{j,k}\}}\left(\frac{t_{j,k} - t_{j,0}}{T_{j,k,l} - t_{j,0}}(P_{j,k,l} - P_{j,k,l_{j,k}})\right)\right]$$

Finally, the greedy scheduling scheme chooses the job j which maximizes this metric.

$$\max_j \left\{\sum_{k=k_j}^{K_j} \left[\max_{\{l|l_{j,k} < l \leq D_{j,k}\}}\left(\frac{t_{j,k} - t_{j,0}}{T_{j,k,l} - t_{j,0}}(P_{j,k,l} - P_{j,k,l_{j,k}})\right)\right]\right\}$$

Figure 7A:
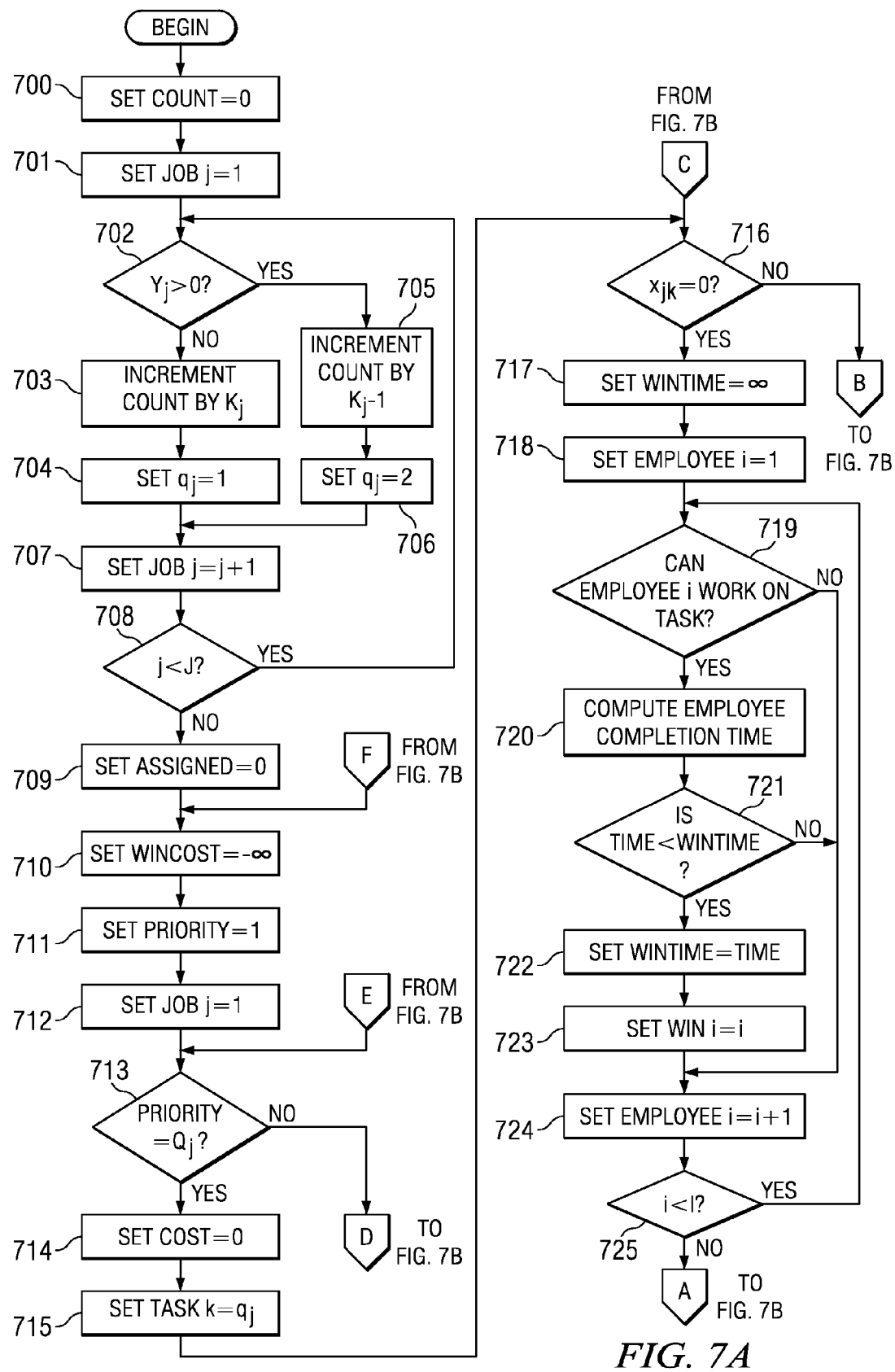
FIGS. 7A and 7B are flowcharts illustrating the operation of a greedy module in accordance with a preferred embodiment of the present invention.
Figure 7B:
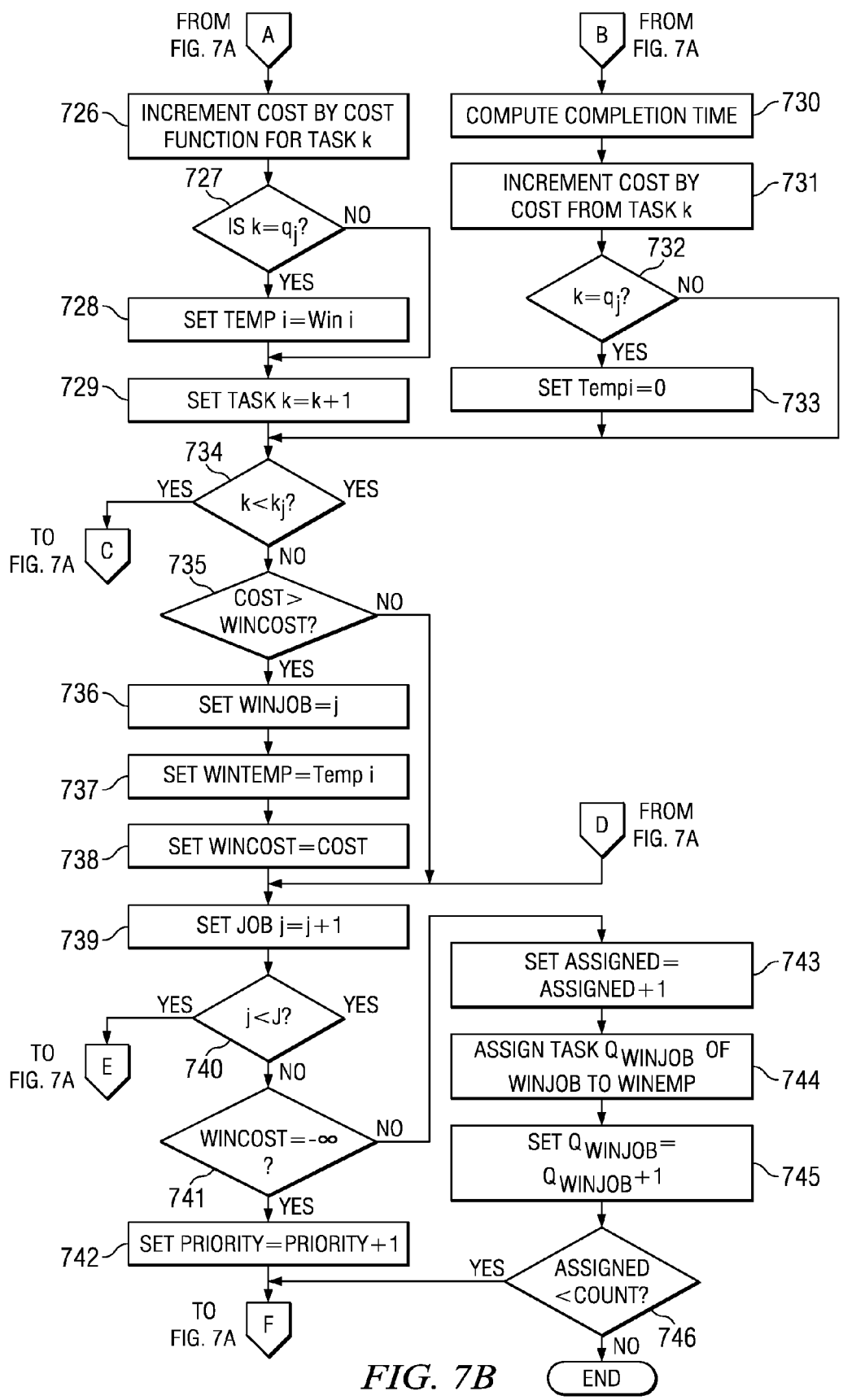

To understand the complete algorithmic details, consider the flowchart in FIGS. 7A and 7B, which illustrates the operation of the greedy module in accordance with a preferred embodiment of the present invention. The process begins and the scheme initializes the value COUNT to be 0 (step 700). COUNT will count the number of queued tasks to be scheduled. The job j is initialized to be 1 (step 701). The scheme then determines whether $Y_j$ is greater than or equal to 0 (step 702). If it is not, the first task of job j is queued and the process increments COUNT by $K_j$ (step 703) and initializes the first queued task $q_j$ of job j to be 1 (step 704).

If $Y_j$ is greater than or equal to 0, then the first task of job j is active and the process increments COUNT by $K_j-1$ (step 705) and initializes the first queued task $q_j$ of job j to be 2 (step 706). In either case the scheme then proceeds to step 707 to increment the value of job j. Then, a determination is made as to whether $j \leq J$, that is, if there are more jobs to consider (step 708). If there are more jobs to consider, then the scheme returns to step 702. Otherwise, the scheme initializes the number ASSIGNED of queued tasks assigned to be 0 (step 709). Then, the scheme initializes the value WINCOST of the winning cost found thus far to be −∞ (step 710). Next, the priority level PRIORITY is initialized to be 1, the highest priority (step 711). The scheme initializes the job j again to be 1 (step 712).

Next, a determination is made as to whether PRIORITY=$Q_j$, in other words, if the job has the right priority (step 713). The case where the priority is wrong is deferred for the time being. If the priorities match, the scheme initializes COST to be 0 (step 714). Then, the process initializes task k to be $q_j$, the first queued task of job j (step 715). Then, a determination is made as to whether $X_{j,k}$ is 0, that is, if the task is a delay task or not (step 716). The case of a delay task is deferred at this time. If the task is not a delay task, the process initializes WINTIME, the value of the winning time found thus far, to be ∞ (step 717). Then, the scheme initializes the employee i being considered to be 1 (step 718).

A determination is then made as to whether employee i can work on task k of job j (step 719). This determination is made using several checks. First, the value $S_{j,k,l}$ must be finite. Second, neither the employee i nor the job j can be parked. Third, the availability $B_{i,m}$ of employee i cannot be consistently 0. Fourth, the commonality index $n=C_{j,k}$ for task k of job j cannot point to another employee $E_n$. In other words, the value of n or the value of $E_n$ must be 0. Finally, the non-simultaneity index $N_{j,k}$ for task k of job j cannot entirely prohibit scheduling. The case where employee i cannot work on task k of job j is deferred for the moment.

However, if step 719 determines that employee i can work on task k of job j, then the scheme computes the earliest completion time for the task (step 720). This is a search amongst all periods in which the employee is free. Starting at the beginning of a free period, and increasing that value to the first time during the period in which the task can be performed, the scheme computes the amount of task work that can be performed until the next availability change $R_{i,m}$ of the total $A_i$, using the availability value $B_{i,m-1}$. If this amount of work is less than the amount of work remaining, then the amount of work is reduced by the amount achieved by $R_{i,m}$, m is incremented by one and the check is repeated. If this amount of work equals or exceeds the amount or work remaining, then the actual completion time is an easy computation and is less than or equal to $R_{i,m}$. If that completion time is less than the start of the next busy period, then the task "fits" in this free period and the process completes. Otherwise, the next free period is considered and the process repeats. Ultimately the completion time TIME is computed by step 720.

Thereafter, a determination is made as to whether TIME<WINTIME (step 721). The case that TIME≧WINTIME is deferred for the moment. If TIME<WINTIME, then the process sets WINTIME to be TIME (step 722) and sets WIN i to be i (step 723). Then, the scheme increments the employee index i (step 724). Step 724 is also reached if a negative answer is achieved in step 719 or step 721. Then, a determination is made as to whether i≦I, the total number of employees (step 725). If i≦I, then the scheme returns to step 719.

Otherwise, the scheme increments the value COST by the cost function for task k (step 726). This is a formula described in great detail above. Then, a determination is made as to whether $k=q_j$, the first queued task of job j (step 727). If $k=q_j$, then the winning employee WIN i is recorded as TEMP i (step 728). Thereafter, or if the determination in step 727 yields a negative result, the process increments task k (step 729).

The next step in the scheme at this point is deferred to discuss the case where step 716 discovers a delay task. This occurs in step 730, where the completion time of this delay is computed by simply adding the computation time $S_{j,k,0}$ to the current time. Then the process increments the value COST by the function for task k, using the same methodology as described above (step 731). Then, a determination is made as to whether $k=q_j$ (step 732), as in step 727. If it is, then the winning "employee" TEMP i is recorded as 0 in step 733, and the scheme proceeds to step 734. This is also the next step after step 729.

In step 734, a determination is made as to whether $k≦K_j$. If $k≦K_j$, then the scheme returns to step 716. If not, a determination is made as to whether COST>WINCOST (step 735). The case where it is not is deferred for the time being. If COST>WINCOST, the process sets WINJOB equal to job j (step 736), sets WINEMP equal to employee TEMPi (step 737), and sets WINCOST equal to the winning cost COST (step 738). Then, the scheme proceeds with step 739, which is also reached from step 735 if COST≦WINCOST. Step 739 is also reached if step 713 found that PRIORITY≠$Q_j$. In this step, the scheme increments the job j. Then, a determination is made as to whether j≦J (step 740). If j≦J, then the scheme returns to step 713. Otherwise, a determination is made as to whether WINCOST=∞ (step 741). This would mean that no appropriate jobs of the current priority have been found. If WINCOST=∞, then the process increments PRIORITY (step 742) and the scheme returns to step 710. Otherwise, the scheme has found a task to assign, so the process increments ASSIGNED (step 743). Then, the process assigns task $q_{WINJOB}$ of WINJOB to employee WINEMP (step 744) and increments $q_{WINJOB}$, removing that task from the queued list (step 745). Next, a determination is made as to whether ASSIGNED<COUNT (step 746). In other words, are there any tasks left to assign? If the answer is yes, then the scheme returns to step 710. If not, the process ends.

4. The Randomized Scheduling Scheme

The randomized scheduling scheme attempts to complete a schedule containing the active tasks by adding in random assignments for the queued tasks which meet the constraints. The scheme will generally yield solutions of mediocre quality, but because it is fast many of these solutions can be implemented. The best solution found to date for a particular problem instance is retained. More precisely, the randomized scheme makes use of a random seed to make the first of its random choices, and that random seed is automatically updated during the random number calculation. Although many random choices are made in the randomized scheduling scheme, the process is entirely deterministic when initialized with a given random seed. So the scheme does not actually retain the entire solution, just the random seed that yields that solution. The best solution can then be quickly recovered if and when it is needed. For details on random number generators see W. Press, B. Flannery, S. Teukolsky, and W. Vetterling, *Numerical Recipes*, Cambridge University Press, 1986.

Figure 8A:
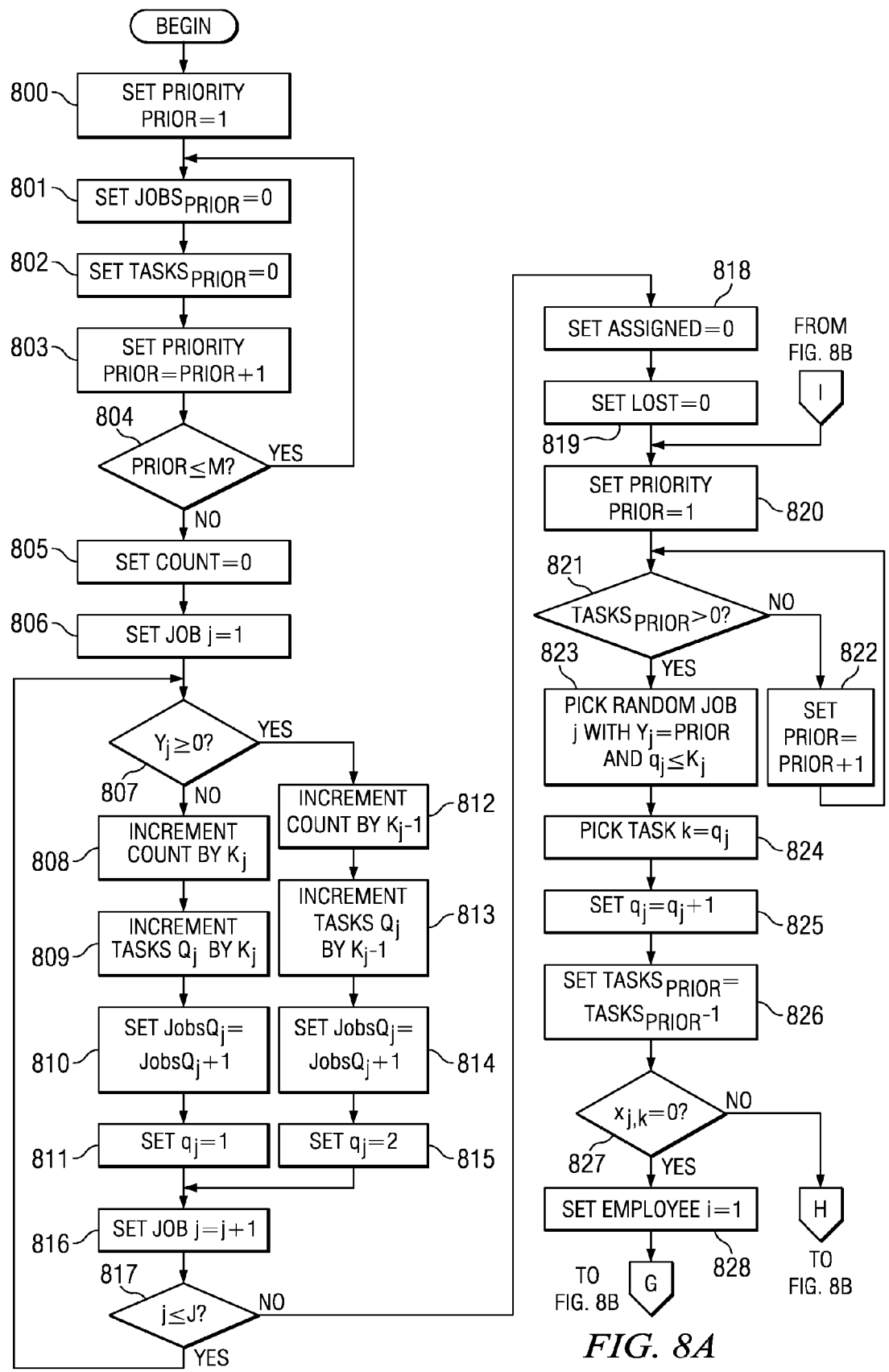
FIGS. 8A and 8B are flowcharts illustrating a randomized scheduling scheme in accordance with a preferred embodiment of the present invention.
Figure 8B:
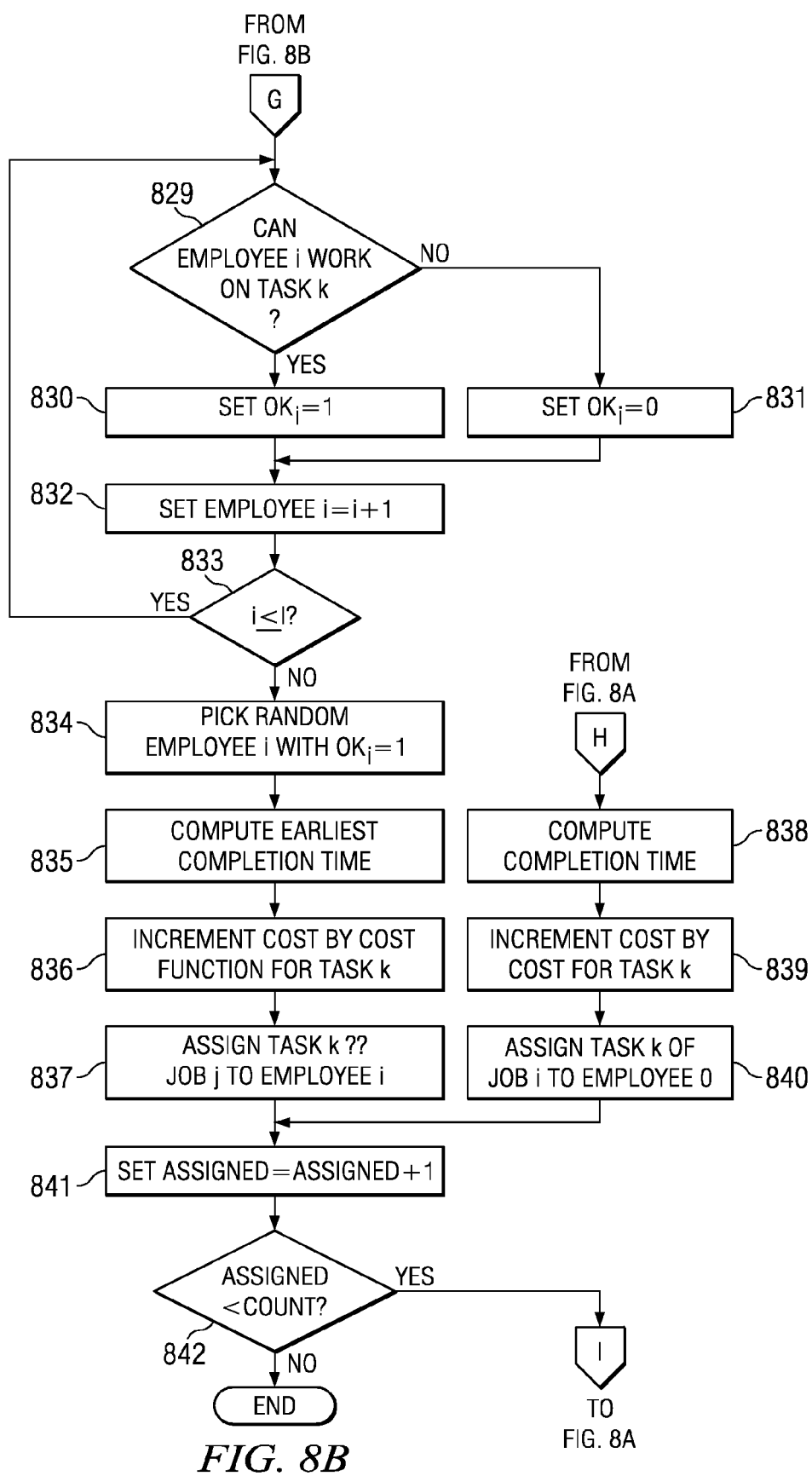

With reference now to FIGS. 8A and 8B, a flowchart illustrating a randomized scheduling scheme is shown in accordance with a preferred embodiment of the present invention. The process begins and the scheme initializes the priority value PRIOR to be 1, the highest priority (step 800). Then, the scheme initializes the number $JOBS_{PRIOR}$ of jobs with priority PRIOR to be 0 (step 801) and initializes the number $TASKS_{PRIOR}$ of tasks with priority PRIOR to be 0 (step 802). Then, the scheme increments the value of the priority PRIOR (step 803), a determination is made as to whether PRIOR≦M, the maximum number of priorities (step 804). If PRIOR≦M, then the scheme returns to step 801. Otherwise, the scheme initializes the value COUNT to be 0 (step 805). COUNT will count the number of queued tasks to be scheduled.

Thereafter, the scheme initializes the job j to be 1 (step 806). A determination is made as to whether $Y_j$ is greater than or equal to 0 (step 807). If it is not, then the first task of job j is queued, and the scheme increments COUNT by $K_j$ (step 808), increments the value $TASKS_{Qj}$ by $K_j$ (step 809), increments the value $JOBS_{Qj}$ (step 810), and initializes the first queued task $q_j$ of job j to be 1 (step 811). However, if $Y_j \geq 0$, then the first task of job j is active, the scheme increments COUNT by $K_j-1$ (step 812), increments the value $TASKS_{Qj}$ by $K_j-1$ (step 813), increments the value $JOBS_{Qj}$ (step 814), and initializes the first queued task $q_j$ of job j to be 2 (step 815). In either case the scheme then continues to step 816 to increment the value of job j.

Thereafter, a determination is made as to whether $j \leq J$, that is, if there are more jobs to consider (step 817). If there are more jobs to consider, the scheme returns to step 807. Otherwise, the scheme initializes the number ASSIGNED of assigned tasks to be 0 (step 818), initializes the value COST of the objective function to be 0 (step 819), and initializes the priority value PRIOR to be 1 (step 820). Next, a determination is made as to whether $TASKS_{prior} > 0$, that is, if there are tasks of that priority (step 821). If not, then the scheme increments the value of PRIOR (step 822) and returns to step 821. If there are tasks of that priority in step 821, the process picks a random job number j, based on the current random seed, such that $Q_j = PRIOR$ and $q_j \leq K_j$, recomputing the current seed as it proceeds (step 823). Then, the scheme picks the next task $k = q_j$ (step 824), increments $q_j$ (step 825), and decrements TASKS PRIOR (step 826).

A determination is made as to whether $X_{j,k}$ is 0 (step 827), that is, if the task is a delay task or not. For the moment, the case of a delay task is deferred. If the task is not a delay task, the process initializes the employee i to be 1 (step 818). Then, a determination is made as to whether employee i can work on task k (step 819). The determinations are identical to those of step 719 from the greedy scheme described above. If the employee can work on the task, then the variable $OK_i$ is set to 1 (step 830). If the employee cannot work on the task in step 819, the variable $OK_i$ is set to 0 (step 831). In either case, the scheme continues step 832, which increments the employee i.

Next, a determination is made as to whether $i \leq I$, the total number of employees (step 833). If $i \leq I$, the scheme returns to step 829. Otherwise, the process picks a random employee i satisfying $OK_i = 1$, based on the current random seed, re-computing the current seed as it proceeds (step 834). Then, the process computes the earliest possible completion time for the task (step 835). This is a search amongst all periods in which the employee is free, identical to that of step 720 from the greedy scheme described above. Next, the scheme increments the value COST by the cost function for task k (step 836). This is identical to the calculation in step 726 from the greedy scheme described above. The scheme then assigns task k of job j to employee i (step 837).

The next step in the scheme is deferred at this point to discuss the case where a delay task is discovered in step 827. In this case, the scheme computes the completion time of this delay by simply adding the computation time $S_{j,k,0}$ to the current time (step 838). This is identical to step 730 in the greedy scheme described above. Then, the scheme increments the value COST by the cost function for task k (step 839), using the same methodology as described above, and assigns task k of job i to employee 0 (step 840). At step 841, which is also reached from step 837, the scheme increments the value ASSIGNED. Thereafter, a determination is made as to whether ASSIGNED $\leq$ COUNT, that is, if there are more queued tasks to assign (step 842). If ASSIGNED $\leq$ COUNT, then the scheme returns to step 820. Otherwise, the scheme ends.

5. The Think Time Allocation Scheme

During periods between the arrival of events, the scheduler of the present invention has time to think more deeply about variants of the problem at hand. Specifically, there are a number of queued tasks belonging to various jobs, and there are a number of active tasks belonging to distinct jobs that are being performed by the personnel and/or other resources. These have estimated expected completion times, computable from the distributions of the completion times. Although one cannot know which of the currently active tasks will complete first, and when it will complete, one can use the existing data to make educated guesses.

As already mentioned, the scheduler of the present invention approximates these completion times based on the current time t and the time slot length $\tau$ to be $t+\tau$, $t+2\tau$, and so on, up to (but not including) a time horizon of $t+H\tau$. If there are J active jobs, this yields a total of $J(H-1)$ bets. For a bet (j,h) consisting of active job j, task 1, and time slot $t+h\tau$, the scheduler of the present invention estimates the completion time of all other active tasks by choosing the expected value from the distribution conditioned on the completion time being greater than $t+h\tau$, and then rounds the result to the nearest time slot amongst the set $\{t+2\tau, \ldots, t+H\tau\}$. For all other queued tasks, the expected task times are used as is. Thus any bet yields a problem instance differing from the others only in the values of some of the parameters of the form $S_{j,k,l}$. One can compute, using elementary probability theory, the relative probabilities (or odds) $P_{j,h}$ of each bet winning. The scheduler of the present invention now employs the greedy scheduler in order to get an initial solution for each bet (j,h) with associated penalty $p_{j,h}$. The scheduler of the present invention also calculates an estimated concave improvement function $F_{j,h}(u)$ of allocated think time u, such that $F_{j,h}(0) = p_{j,h}$.

Figure 9:
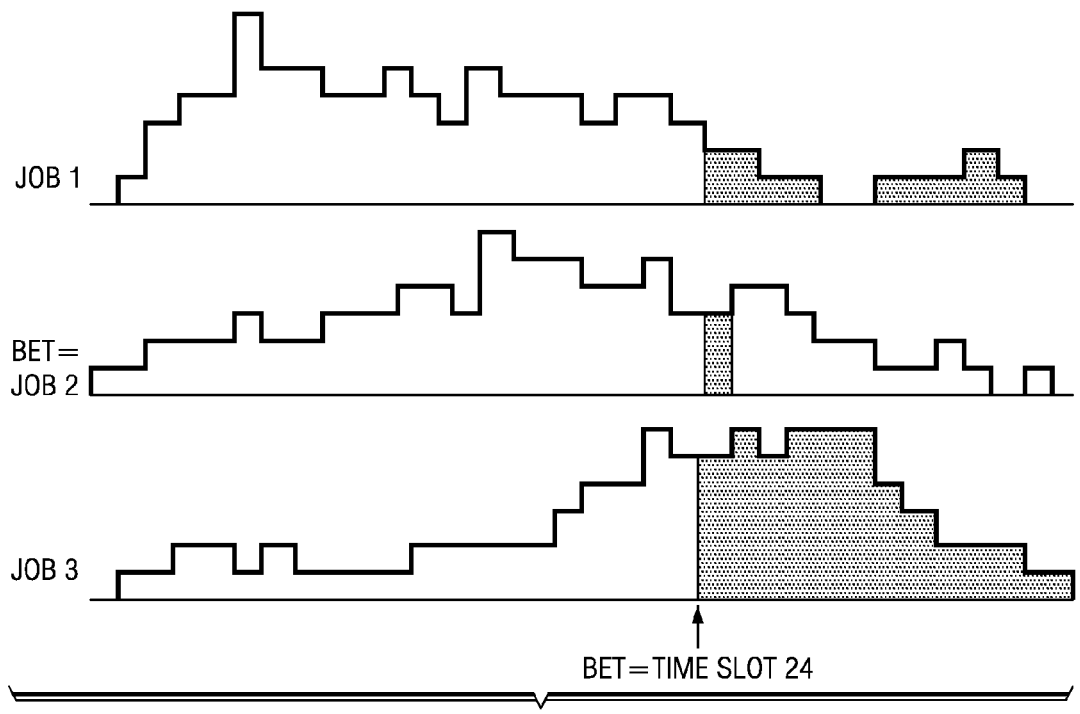
FIG. 9 illustrates relevant components for calculating active tasks in accordance with a preferred embodiment of the present invention.
Figure 10:
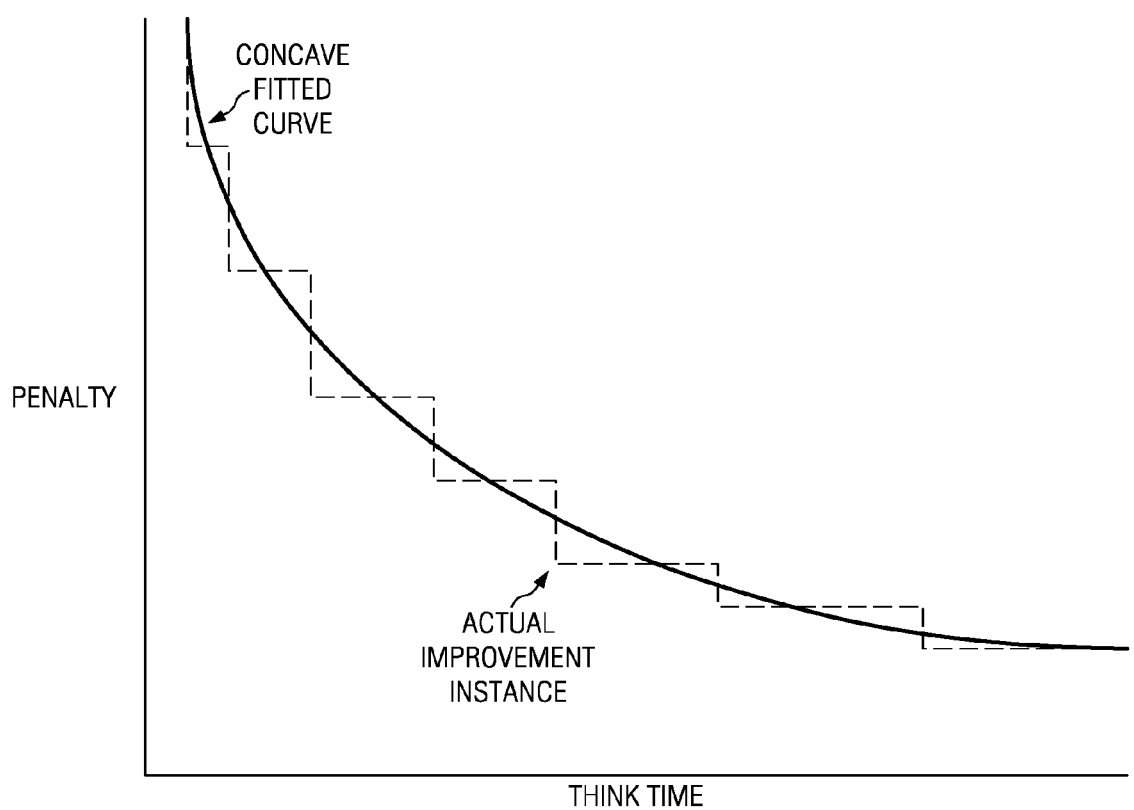
FIG. 10 illustrates a typical concave improvement function learned using the scheduler of the present invention from runs of the randomized scheme.

FIG. 9 illustrates the relevant components of the odds calculation for $\hat{J}=3$ active tasks. In this case, the bet involves a task for job 2 and the $24^{th}$ time slot. The distribution for this task during that time slot and the tails of the distributions for job 1 and job 2 tasks are the important quantities. The formula is standard. FIG. 10 illustrates a typical concave improvement function, learned using the scheduler of the present invention from runs of the randomized scheme.

Assuming a window of size W time slots, the invention allows the thinking about a given bet (j, h) during the time slots ending at times $t+h^*\tau$ through $t+h\tau$, where $h^* = \max(1, (h-W+1))$, as previously noted. Let $u_{j,h,w}$ denote the amount of think time allocated to bet (j, h) during the time slot ending at time $t+w\tau$. The goal is to minimize the expected penalty $$\sum_j \sum_{h=1}^{H-1} P_{j,h} F_{j,h}\left(\sum_{w=h^*}^{h} u_{j,h,w}\right)$$

subject to the constraints $$\sum_j \sum_{w=h^*}^{h} u_{j,h,w} = \tau$$

for all $1 \leq h < H$. This is a network for a resource allocation problem whose directed graph contains a single source and $J(H-1)$ sink nodes. The goal is minimization of the sum of concave functions at the sinks, and this problem can be solved quickly and exactly. See R. Ahuja, T. Magnanti, and J. Orlin, *Network Flows*, Prentice Hall, 1993, for details on network flow problems and T. Ibaraki and N. Katoh, *Resource Allocation Problems. Algorithmic Approaches*, MIT Press, 1988, for details on network flow resource allocation problems.

Figure 11:
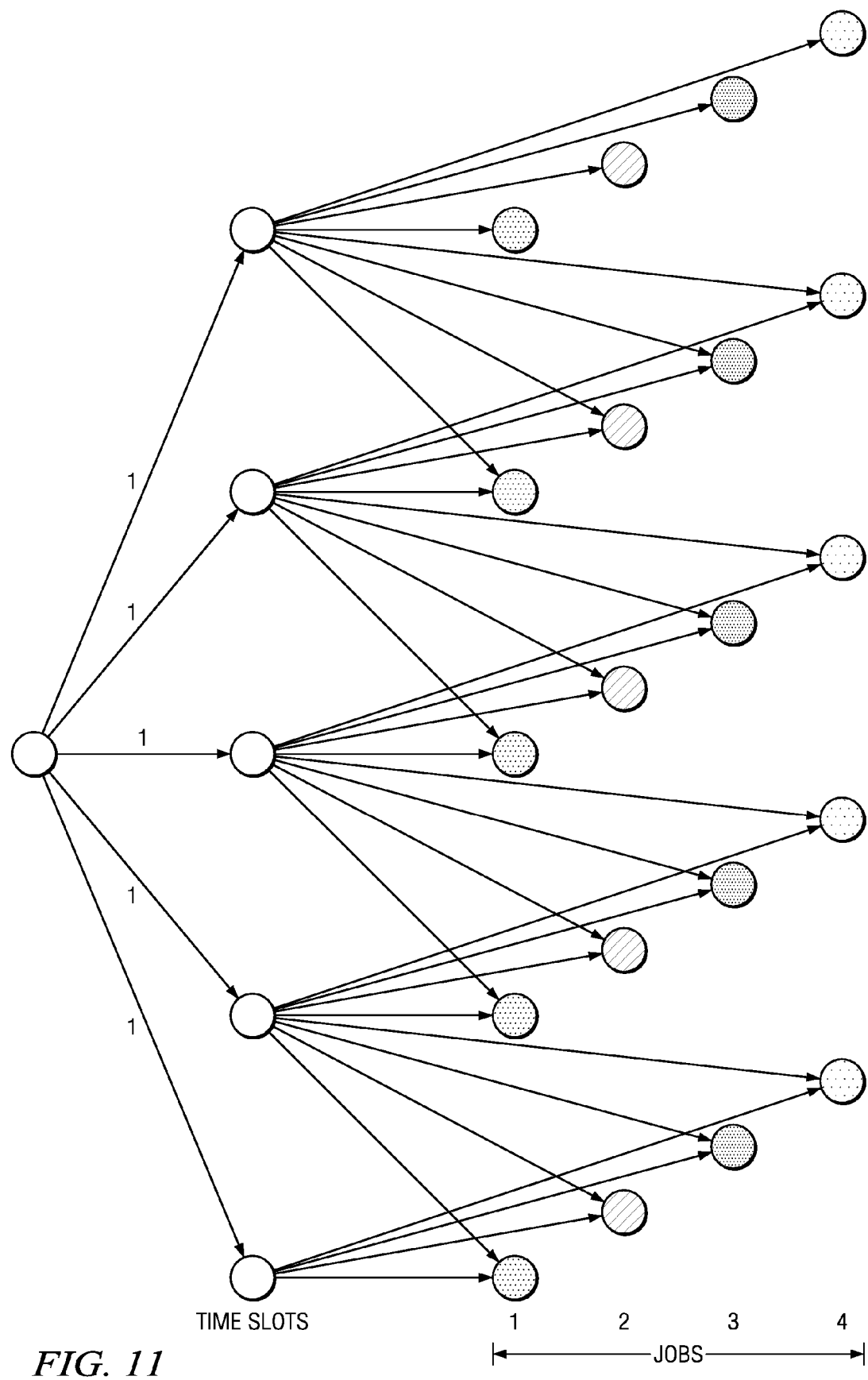
FIG. 11 depicts a network associated with a typical network flow resource allocation problem according to a preferred embodiment of the present invention.

FIG. 11 depicts a network associated with a typical network flow resource allocation problem in accordance with a preferred embodiment of the present invention. In this case there are $\hat{J}=4$ active jobs. The time horizon is H=6, and the window size is W=2. The source node distributes H−1=5 units of think time, one unit to each of the time slots. All other 20 nodes in the bipartite directed graph are sink nodes, with the 4 job/task combinations arranged horizontally and the 5 time slots arranged vertically. Notice that each sink node except for those in the first row are the target of 2 directed arcs.

Figure 12:
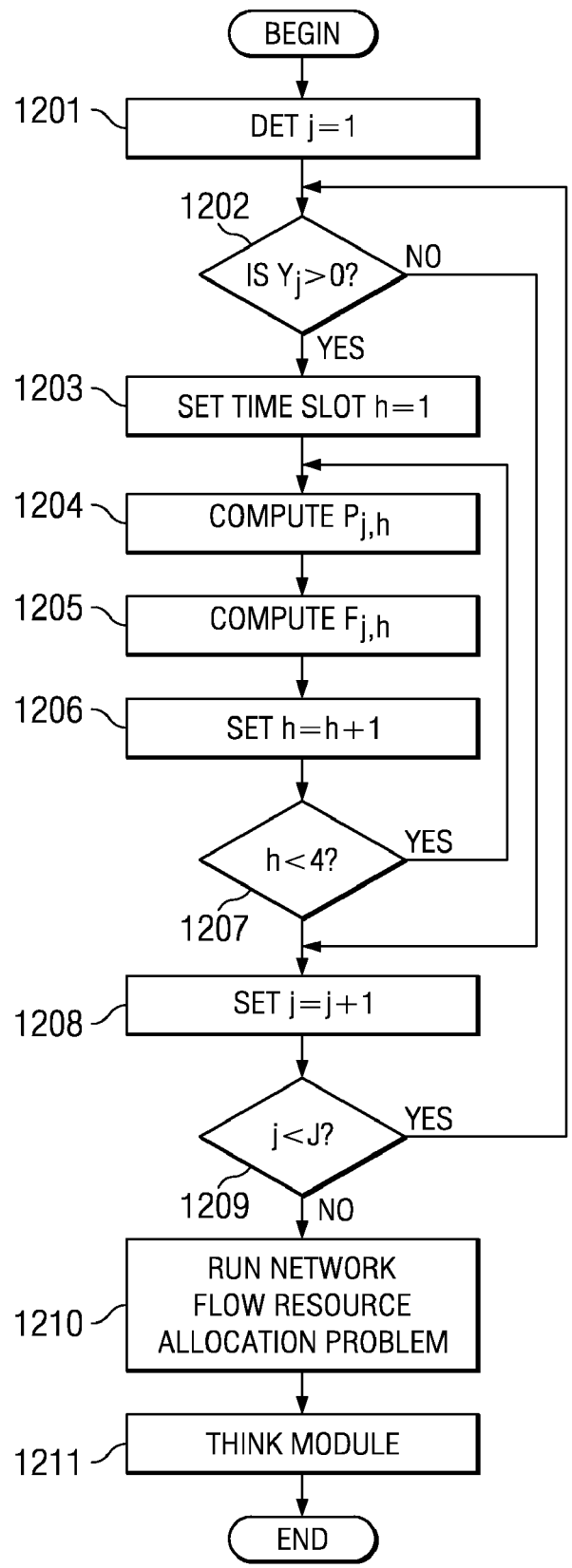
FIG. 12 is a flowchart illustrating a think time allocation scheme in accordance with a preferred embodiment of the present invention.

With reference now to FIG. 12, a flowchart illustrating a think time allocation scheme is shown in accordance with a preferred embodiment of the present invention. The process begins and the scheme initializes the job j to be 1 (step 1201). Then, a determination is made as to whether $Y_j \geq 0$ (step 1202). If not, then the task is queued. This case is deferred for the time being. If $Y_j \geq 0$, then the task is active, and the scheme initializes the time slot h to be 1 (step 1203), computes the value of the relative probability $p_{j,h}$ (step 1204), and computes the function $F_{j,h}$ (step 1205). Then, the scheme increments the value of h (step 1206).

A determination is then made as to whether h<H (step 1207). If h<H, then the scheme returns to step 1204. Otherwise, or if the job j was inactive in step 1202, the scheme increments j (step 1208). Thereafter, a determination is made as to whether $j \leq J$ (step 1209). If $j \leq J$, then control is passed back to step 1202. Otherwise, the scheme runs the network flow resource allocation problem (step 1210) to produce the proper think time allocations in each time slot. It then enters the actual think time execution state (step 1211) and it will not stop its thinking until interrupted by another event. Thereafter, the process ends.

During actual think time execution the invention continually monitors and adjusts the amount of actual think time. This is because the times may drift slightly due to the atomicity of the randomized scheme, due to extraneous systems work which must be done by the processor, and so on. Truing up the time allocations helps keep the scheduler close to its allocated think times.

6. Implementation Issues

In practice, a job may be far more complex than a simple chain precedence task list. A workflow engine, used in a preferred embodiment of the invention, will generally support jobs, also referred to as processes, which are a network of tasks represented as a directed graph. The order in which tasks are performed is determined by control flow links between tasks. These links can be conditional. That is, the links may be resolved at runtime. Additionally, a task may be the starting point or ending point of any number of links, allowing for parallel execution. Moreover, a task can be a single entity (e.g., a program), a sub-process, which allows for simplification and reuse, or a block of tasks repeated until a condition is met, which allows for looping behavior.

Because the scheduler in the present invention supports only chain precedence, the preferred embodiment includes a method to dynamically convert at runtime a task graph into chain precedence order. Although this conversion cannot necessarily be accomplished for an arbitrary task graph, the current embodiment can support a larger and more realistic subset of task graphs than just those than can be represented by chain precedence. In order to accomplish this runtime conversion to a chain precedence task list, a process analysis step is required to capture process details for use at runtime and to ensure that the process obeys the following restrictions:

There can be no possible parallel execution of tasks which require scheduled resources. However, there can be parallel execution paths which contain only tasks which do not require any scheduled resources and which have no immediate or subsequent links with tasks which do require scheduled resources. Such parallel paths are defined by flagging the initial link(s) as "ignore" for purpose of resource scheduling. All subsequent links are automatically regarded as "ignore" links.

A task can be the starting point for at most one unconditional link which is not flagged as "ignore" or one conditional link which is flagged as "expected."

A sub-process or block task must be flagged as "transparent" if any of its tasks require resource scheduling. Note: for transparent blocks, one may specify the expected number of iterations or assume one iteration.

Expected times must be supplied for all tasks which are not on an ignored path (that is, not the end point of an ignored link) with the exception of transparent sub-process and block tasks for which expected times must be supplied for all contained tasks (subject to the same condition).

At runtime, an entity called the Process Execution Manager monitors the execution of each process instance variant which requires resource scheduling. The Process Execution manager informs the scheduler of task completions and any changes to the expected task list for the process instance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for resource allocation of a plurality of tasks carrying penalties based on their completion time, the method comprising:

identifying the plurality of tasks to be assigned to one or more resources, wherein each job of a plurality of jobs includes multiple tasks ordered by chain precedence, wherein the plurality of jobs include active jobs and queued jobs, and wherein the plurality of tasks are associated with the active jobs; and assigning resources including start times for the plurality of tasks, using a processor, such that expected penalties for completion times of the plurality of tasks are reduced, wherein assigning the start times for the plurality of tasks comprises:
assigning a time period to an allocated think time partition in a time slot for each active job, wherein each time slot of a plurality of time slots comprises a plurality of allocated think time partitions corresponding to the active jobs;
performing immediate assignments of resources for the plurality of jobs based on expected execution times of tasks by executing an initial algorithm to form a preliminary solution for scheduling the plurality of jobs;
responsive to performing the immediate assignments, simulating random assignments for the plurality of jobs by executing a randomized algorithm to form a plurality of simulations for a duration of the time period assigned to the allocated think time partition to determine a probable best solution for scheduling the plurality of jobs, and wherein the probable best solution is calculated for each allocated think time partition; and
executing one of the initial algorithm and the randomized algorithm to assign resources for the completion of the plurality of tasks based on whether the initial algorithm or the randomized algorithm produced a best solution.

2. The method of claim 1, further comprising:
allocating an amount of time for the assignment of the start times for the plurality of tasks into separate time partitions for predictable potential next events;
during each partition in the separate time partitions, allocating resources for a predicted next event at a predicted time at which the predicted next event may occur; and
assigning resources for queued tasks based upon an actual next event and an actual time of occurrence.

3. The method of claim 2, wherein allocating the amount of time includes:
reserving a first amount of time for performing an initial algorithm; and
allocating a second amount of time for performing a randomized algorithm.

4. The method of claim 3, wherein allocating resources for the predicted next event at the predicted time at which the predicted next event may occur includes:
executing the initial algorithm to form a preliminary solution;
recording a seed value of zero to indicate that a current solution is the preliminary solution; and
repeatedly executing the randomized algorithm until an event occurs or the second amount of time expires.

5. The method of claim 1, wherein assigning the start times for the plurality of tasks further comprises:
responsive to identifying a job with a priority level that is greater than any of the active jobs, performing assignments and reassignments for the plurality of jobs; and
retaining a random seed value from the plurality of simulations, the random seed value that generates a current best random solution for scheduling the plurality of jobs using the randomized algorithm, wherein the random seed value is initialized to zero to indicate that the preliminary solution is the current best random solution, and wherein the random seed value is updated in response to executing the randomized algorithm additional times and finding a better solution than the current best random solution.

6. The method of claim 5, wherein assigning the start times for the plurality of tasks further comprises:
determining whether the best solution was found using the initial algorithm or the randomized algorithm; and
responsive to the best solution being found using the initial algorithm, executing the initial algorithm and assigning resources based on results of the initial algorithm.

7. The method of claim 6, wherein assigning the start times for the plurality of tasks further comprises:
responsive to the best solution being found using the randomized algorithm, executing the randomized algorithm using the seed value and assigning resources based on results of the randomized algorithm.

8. The method of claim 7, further comprising:
assigning only immediately starting tasks.

9. The method of claim 4, wherein an event is one of a job arrival, a task completion, a data change arrival, a managerial schedule request, and a termination request.

10. The method of claim 9, wherein a job includes one or more tasks.

11. A method for solving a problem, the method comprising:
identifying a plurality of tasks to be assigned to one or more resources, wherein each job of a plurality of jobs includes multiple tasks ordered by chain precedence, wherein the plurality of jobs include active jobs and queued jobs, and wherein the plurality of tasks are associated with the active jobs; and
assigning resources including start times for the plurality of tasks, using a processor, such that expected penalties for completion times of the plurality of tasks are reduced, wherein assigning the resources including start times for the plurality of tasks comprises:
assigning a time period to an allocated think time partition in a time slot for each active job, wherein each time slot of a plurality of time slots comprises a plurality of allocated think time partitions corresponding to the active jobs;
performing immediate assignments of resources for the plurality of jobs based on expected execution times of tasks by executing an initial algorithm to form a preliminary solution for scheduling the plurality of jobs;
responsive to performing the immediate assignments, simulating random assignments for the plurality of jobs by executing a randomized algorithm to form a plurality of simulations for a duration of the time period assigned to the allocated think time partition to determine a probable best solution for scheduling the plurality of jobs, and wherein the probable best solution is calculated for each allocated think time partition;
executing one of the initial algorithm and the randomized algorithm to assign resources for the completion of the plurality of tasks based on whether the initial algorithm or the randomized algorithm produced a best solution;
responsive to identifying a job with a priority level that is greater than any of the active jobs, performing assignments and reassignments for the plurality of jobs;
simulating random assignments for the plurality of jobs by executing a randomized algorithm to form a plurality of simulations;
retaining a random seed value from the plurality of simulations, the random seed value that generates a current best random solution for scheduling the plurality of jobs using the randomized algorithm, wherein the random seed value is initialized to zero to indicate that the preliminary solution is the current best random solution, and wherein the random seed value is updated in response to executing the randomized algorithm additional times and finding a better solution than the current best random solution;

determining whether a best solution was found using the initial algorithm or the randomized algorithm;

responsive to the best solution being found using the initial algorithm, executing the initial algorithm and assigning resources based on results of the initial algorithm; and responsive to the best solution being found using the randomized algorithm, executing the randomized algorithm using the random seed value and assigning resources based on results of the randomized algorithm.

12. An apparatus, in a data processing system, for resource allocation of a plurality of tasks carrying penalties based on their completion time, the apparatus comprising:

a bus;

a set of storage devices operably connected to the bus, the set of storage devices storing program code; and a processor running a scheduler and operably connected to the bus, wherein the processor is configured to execute the program code to:

identify the plurality of tasks to be assigned to one or more resources, wherein each job of a plurality of jobs includes multiple tasks ordered by chain precedence, wherein the plurality of jobs include active jobs and queued jobs, and wherein the plurality of tasks are associated with the active jobs; and assign resources including start times for the plurality of tasks such that expected penalties for completion times of the plurality of tasks are reduced, wherein assigning the resources including start times for the plurality of tasks comprises:

assigning a time period to an allocated think time partition in a time slot for each active job, wherein each time slot of a plurality of time slots comprises a plurality of allocated think time partitions corresponding to a plurality of active jobs;

performing immediate assignments of resources for the plurality of jobs based on expected execution times of tasks by executing an initial algorithm to form a preliminary solution for scheduling the plurality of jobs;

simulating, responsive to performing the immediate assignments, random assignments for the plurality of jobs by executing a randomized algorithm to form a plurality of simulations for a duration of the time period assigned to the allocated think time partition to determine a probable best solution for scheduling the plurality of jobs, and wherein the probable best solution is calculated for each allocated think time partition; and executing one of the initial algorithm and the randomized algorithm to assign resources for the completion of the plurality of tasks based on whether the initial algorithm or the randomized algorithm produced a best solution.

13. A computer program product for resource allocation of a plurality of tasks carrying penalties based on their completion time, the computer program product comprising:

a set of storage devices;

program code, stored on at least one of the set of storage devices, for identifying the plurality of tasks to be assigned to one or more resources, wherein each job of a plurality of jobs includes multiple tasks ordered by chain precedence, wherein the plurality of jobs include active jobs and queued jobs, and wherein the plurality of tasks are associated with the active jobs; and program code, stored on at least one of the set of storage devices, for assigning resources including start times for the plurality of tasks such that expected penalties for completion times of the plurality of tasks are reduced, wherein the program code for assigning the resources including start times for the plurality of tasks comprises:

program code, stored on at least one of the set of storage devices, for assigning a time period to an allocated think time partition in a time slot for each active job, wherein each time slot of a plurality of time slots comprises a plurality of allocated think time partitions corresponding to the active jobs;

program code for performing immediate assignments of resources for the plurality of jobs based on expected execution times of tasks by executing an initial algorithm to form a preliminary solution for scheduling the plurality of jobs;

program code, stored on at least one of the set of storage devices, for responsive to performing the immediate assignments, simulating random assignments for the plurality of jobs by executing a randomized algorithm to form a plurality of simulations for a duration of the time period assigned to the allocated think time partition to determine a probable best solution for scheduling the plurality of jobs, and wherein the probable best solution is calculated for each allocated think time partition;

program code, stored on at least one of the set of storage devices, for executing one of the initial algorithm and the randomized algorithm to assign resources for the completion of the plurality of tasks based on whether the initial algorithm or the randomized algorithm produced a best solution.

14. The computer program product of claim 13, further comprising:

program code for allocating an amount of time for the assignment of the start times for the plurality of tasks into separate time partitions for predictable potential next events;

program code for allocating resources, during each partition in the separate time partitions, for a predicted next event at a predicted time at which the predicted next event may occur; and program code for assigning resources for queued tasks based upon an actual next event and an actual time of occurrence.

15. The computer program product of claim 14, wherein the program code for allocating the amount time includes:

program code for reserving a first amount of time for performing an initial algorithm; and program code for allocating a second amount of time for performing a randomized algorithm.

16. The computer program product of claim 15, wherein the program code for allocating resources for the predicted next event at the predicted time at which the predicted next event may occur includes:

program code for executing the initial algorithm to form a preliminary solution;

program code for recording a seed value of zero to indicate that a current solution is the preliminary solution; and program code for repeatedly executing the randomized algorithm until an event occurs or the second amount of time expires.

17. The computer program product of claim 13, wherein the program code for assigning the start times for the plurality of tasks further comprises:
- program code for, responsive to identifying a job with a priority level that is greater than any of the active jobs, performing assignments and reassignments for the plurality of jobs; and
- program code for retaining a random seed value from the plurality of simulations, the random seed value that generates a current best random solution for scheduling the plurality of jobs using the randomized algorithm, wherein the random seed value is initialized to zero to indicate that the preliminary solution is the current best random solution, and wherein the random seed value is updated in response to executing the randomized algorithm additional times and finding a better solution than the current best random solution.

18. The computer program product of claim 16, wherein the program code for assigning the start times for the plurality of tasks further comprises:
- program code for determining whether a best solution was found using the initial algorithm or the randomized algorithm; and
- program code for responsive to the best solution being found using the initial algorithm, executing the initial algorithm and assigning resources based on results of the initial algorithm.

19. The computer program product of claim 18, wherein the program code for assigning the start times for the plurality of tasks further comprises:
- program code, responsive to the best solution being found using the randomized algorithm, for executing the randomized algorithm using the seed value and assigning resources based on results of the randomized algorithm.

20. The computer program product of claim 19, further comprising:
- program code for assigning only immediately starting tasks.

21. The computer program product of claim 16, wherein an event is one of a job arrival, a task completion, a data change arrival, a managerial schedule request, and a termination request.

22. The computer program product of claim 21, wherein a job includes one or more tasks.

* * * * *